United States Patent [19]

Kolen et al.

[11] 3,892,873

[45] July 1, 1975

[54] EMULSIFIED OIL DRESSING

[75] Inventors: Eugene P. Kolen, Evanston; Olga C. Golosinec, Park Ridge, both of Ill.

[73] Assignee: Kraftco Corporation, Glenview, Ill.

[22] Filed: Nov. 19, 1973

[21] Appl. No.: 417,132

[52] U.S. Cl.................................. 426/602; 426/613
[51] Int. Cl................................................. A23l 1/24
[58] Field of Search ........... 426/189, 196, 200, 201, 426/202, 356, 359, 362, 363, 211

[56] References Cited
UNITED STATES PATENTS

| | | | |
|---|---|---|---|
| 3,560,220 | 2/1971 | Bangert............................. | 426/189 |
| 3,706,575 | 12/1972 | Broadhead........................ | 426/185 |
| 3,764,347 | 10/1973 | Katz................................... | 426/196 |

OTHER PUBLICATIONS

Webb & Whittier, 2nd Ed., By Products From Milk, Casein and Whey Protein, Avi. Pub. Co., Westport, Conn., 1970, pp. 349–353.

Primary Examiner—A. Louis Monacell
Assistant Examiner—J. M. Hunter
Attorney, Agent, or Firm—Fitch, Even, Tabin & Luedeka

[57] ABSTRACT

Emulsified oil dressings are prepared with an emulsifying agent other than egg yolk. The emulsifying agent is serum protein obtained from milk. The serum protein is treated so that a predetermined level of the protein is denatured.

8 Claims, No Drawings

EMULSIFIED OIL DRESSING

The present invention relates generally to emulsified oil food products and more particularly relates to emulsified oil salad dressings of the type having a major amount of oil in the formulation.

In general, two types of emulsified oil dressings having a major amount of oil in the formulation are known, these being mayonnaise and salad dressing. Mayonnaise is a well-known product which is a combination of an edible oil, water and acid, such as vinegar or lemon juice, and egg yolk. The egg yolk acts to effect emulsification of the oil and water of mayonnaise. As used herein the term "salad dressing" refers to salad dressing as generally defined by the United States Federal Standards. Salad dressing as thus defined is the emulsified food product prepared from an edible vegetable oil, an acidifying ingredient selected from vinegar, lemon juice or lime juice, an egg yolk containing ingredient and a cooked or partly cooked starch paste prepared from a food starch, tapioca flour, wheat flour, rye flour or combinations of these starchy materials.

Mayonnaise and salad dressing may be seasoned with one or more of the following ingredients: salt, sugar or other sweetening ingredient, mustard, paprika or other spice or spice extract, monosodium glutamate and any suitable, harmless food seasoning or flavoring. Salad dressing may also contain emulsifying ingredients other than egg yolk, such as gum acacia, carob bean gum, guar gum, gum karaya, gum tragacanth, carrageenan, pectin, propylene glycol ester of alginic acid, sodium carboxymethylcellulose or any mixture of two or more of these stabilizing ingredients.

The use of egg yolk as an emulsifying agent for mayonnaise and salad dressing is well recognized. In addition, egg yolk supplies protein to the salad dressing, and the presence of protein in the salad dressing is considered desirable. However, the use of egg yolk in mayonnaise and salad dressing is expensive, and it would be desirable to provide a proteinaceous emulsifying material that can be used to replace egg yolk in emulsified oil dressings, such as mayonnaise which have an acid pH. Generally, egg yolk has been the only edible emulsifying agent which has been found to be suitable for the preparation of emulsified salad dressings having a major amount of oil and an acid pH in the range of from about 3 to about 4.5.

Accordingly, it is a principal object of the present invention to provide a proteinaceous emulsifying agent which may be substituted for egg yolk in emulsified oil dressings. It is a further object of the present invention to provide an emulsifying agent which may be substituted for egg yolk in starch base salad dressing-type emulsified oil dressings.

These and other objects of the present invention will become more apparent from the following detailed description and the appended claims.

Generally, in accordance with various features of the present invention, emulsified oil dressings having a pH in the range of from about 3 to about 4.5 are prepared with an emulsifying agent other than egg yolk. The emulsifying agent is the serum protein obtained from milk. The serum protein is treated so that a predetermined level of the serum protein is denatured. The serum protein of milk is that protein which remains soluble in the serum when the milk is treated to recover casein protein by acid or rennet precipitation. The usual manner by which casein is removed from milk is in the manufacture of cheese. The casein is recovered as a curd which is treated to produce cheese and the serum protein remains in the liquid serum of the milk, which is referred to as whey in cheese making operations.

Serum protein remains soluble at the iso-electric point for precipitation of casein. The solubility of the serum protein has been regarded as an indication that the serum protein is substantially undenatured in its "native" condition.

The solubility of proteins in general, and of serum protein in particular, is reduced by denaturation, a process generally regarded as any modification of the native protein structure, exclusive of primary covalent bond hydrolysis. It is considered an important feature of the present invention that the serum protein of milk which is used as an emulsifying agent in the emulsified oil dressings of the invention has been treated to effect a particular level of denaturation. In this connection, when making emulsified oil dressings having from about 50 percent to about 70 percent by weight of oil, the serum protein must be treated to effect denaturation of at least about 70 percent by weight of the serum protein. For emulsified oil dressings having from about 70 percent to about 80 percent oil, the serum protein must have less than about 20 percent denatured protein and preferably from about 0 to about 15 percent denatured protein. Special low heat handling and drying techniques are required to maintain the level of denatured protein below about 20 percent. The level of protein denaturation was determined by Leighton's modification of the Harland-Ashworth procedure as set forth in Australia's Journal of Dairy Technology 36:569.

Denaturation of protein is most usually effected by the application of heat. In this connection, substantially complete denaturation of the serum protein of milk may be effected by heat treatments at 166°F for one hour, 178°F for 30 minutes, 187°F for 5 minutes and equivalent heat treatment. To be useful in the product and method of the present invention, the serum protein must not have been subjected to heat treatment such as to effect more than about 90 percent denaturation of the serum protein.

The milk serum protein is used in the emulsified oil dressings of the invention at a level sufficient to provide from about 0.5 percent to about 5.0 percent by weight of serum protein based on the weight of the emulsion, to provide suitable emulsifying properties. The serum protein may be used at higher levels, but no significant advantage results from the use of higher levels and the stability may be impaired. At levels lower than the indicated range, the serum protein is not effective to effect emulsification at the levels of oil used in the manufacture of emulsified oil dressings.

In this connection, as the level of oil in the emulsified oil dressing is increased, the level of serum protein required to effect emulsification is decreased. For emulsified oil dressings having from about 50 to about 70 percent oil, from about 3 to about 5 percent serum protein is required to effect emulsification. For emulsified oil dressings having from about 70 percent to about 80 percent oil, from about .5 to about 1.5 percent protein is required. At levels of serum protein higher than the indicated range for each oil level range, an undesirable texture and consistency may be obtained in the emulsified oil dressing. At lower levels than the indicated range, there is insufficient emulsification and the emulsion is broken on standing. It should be understood that the above described requirements in respect to denaturation of the serum protein must also be provided for each oil level range.

At the above-indicated level of usage, the serum protein may be used as an emulsifying agent for emulsified oil dressings having a fat content up to about 80 percent by weight of the dressing. If it is considered desirable to produce emulsified oil dressings having higher fat levels up to about 85 percent, a supplementary emulsifying agent may be used. Suitable supplementary emulsifying agents are mono- and di-esters of higher fatty acids and glycerin, mono-esters of higher fatty acids and sorbitan, mono-esters of higher fatty acids and propylene glycol, higher fatty acid esters of polyethylene, esters of higher fatty acids and polyglycerols and mono-esters of higher fatty acids and polyoxyethylene sorbitans. By higher fatty acids is meant those fatty acids having a carbon chain length of from 14 to 20. The supplementary emulsifiers are used in combination with the serum protein at a level of from about 0.1 percent to about 0.4 percent by weight of the supplementary emulsifier, based on the weight of the emulsified oil product. As indicated, however, the supplementary emulsifiers are required only when the fat level of the emulsified oil dressing exceeds about 80 percent by weight. All percentages used herein are by weight unless otherwise specified.

The serum protein useful as an emulsifying agent for emulsified oil dressings in the present invention will most generally be obtained from whey. Whey obtained from usual cheesemaking operations has an analysis approximately as follows:

| INGREDIENTS | WEIGHT PERCENT (DRY BASIS) |
|---|---|
| Protein | 11–14 |
| Lactose | 70–75 |
| Ash | 10–12 |
| Fat | 1–2 |

Whey as obtained from a cheesemaking operation is not suitable to provide serum protein in accordance with the present invention. The protein level is too low. Also, the ash (salt) level, relative to the protein is too high. In a particular embodiment of the present invention whey is treated to increase the serum protein level and decrease the lactose and ash level thereof. It is preferred that whey be treated to provide a whey product having from about 25 to about 80 percent by weight protein. The ash level is reduced to less than about 50 percent by weight, based on the level of protein. It is preferred that the ash level be in the range of from about 2 percent to about 50 percent by weight, based on the level of protein in the treated whey. Lactose comprises the balance of the treated whey product and is present at a level in the range of from about 15 percent to about 65 percent by weight. Protein, lactose and ash percentage levels being expressed on a dry basis. In order to facilitate measuring of the whey solids, it is particularly preferred to use whey which has been dried to provide dry whey solids.

The whey may be used with the non-protein solids associated with the whey so long as the serum protein, lactose and ash level contained in the whey is within the ranges set forth above. It is necessary that the whey be treated by suitable methods so as to remove at least a portion of the lactose and ash therefrom, and to provide a whey fraction with increased levels of serum protein with respect to non-protein solids. Suitable treatment methods include reverse osmosis, ultra-filtration, electrodialysis, gel filtration, lactose crystallization and combinations of such treatment methods. The whey fraction obtained by these treatment methods is preferably dried.

In preparing the emulsified oil dressings of the present invention, the treated whey product is dispersed in water to provide an aqueous whey dispersion. The aqueous whey dispersion is then blended with the oil under agitating conditions to provide a loose emulsion. An edible acid is combined with the loose emulsion at a level sufficient to establish a pH in the finished product of from about 3 to about 4.5. Any edible acid may be used and suitable acids include, but are not linked to, citric acid, malic acid, acetic acid, fumaric acid, hydrochloric acid, gluconic acid, phosphoric acid and mixtures thereof. The loose emulsion is then homogenized in suitable apparatus to provide an emulsified oil dressing.

The following examples further illustrate various features of the present invention, but are intended to in no way limit the scope of the invention, which is defined in the appended claims.

EXAMPLE 1

An emulsified oil dressing was prepared in accordance with the invention. The dressing had the following ingredients at the indicated levels:

| INGREDIENTS | WEIGHT PERCENT |
|---|---|
| Cottonseed oil | 30.0 |
| Soy bean oil | 25.0 |
| Water | 30.7 |
| Vinegar (100 grain) | 6.0 |
| Whey solids* | 7.0 |
| Salt | 1.3 |

The whey solids had been treated by ultrafiltration to provide a whey product having 50 percent protein, 36 percent lactose, and 5 percent ash. The balance comprises fat and edible acids.

The emulsified oil dressing was prepared by dispersing the whey solids in two-thirds of the water. The salt was then added. Thereafter, the oil was slowly added to the whey dispersion under conditions of rapid agitation to provide a loose emulsion. The remaining water and the vinegar were added and the loose emulsion was passed through a colloid mill to provide an emulsified oil dressing having a pH of 4.0. The emulsified oil dressing has the appearance and consistency of mayonnaise. The dressing obtained had the characteristics and stability of mayonnaise and was indistinguishable in tests from a commercially prepared mayonnaise having egg yolk solids as the emulsifying ingredient.

EXAMPLE II

An emulsified oil dressing was prepared in accordance with the method of Example I. The dressing had the following ingredients at the indicated levels:

| INGREDIENTS | WEIGHT PERCENT |
|---|---|
| Cottonseed oil | 45 |
| Soy bean oil | 30 |
| Water | 14.2 |

-Continued

| INGREDIENTS | WEIGHT PERCENT |
| --- | --- |
| Vinegar (50 grain) | 6 |
| Whey solids* | 3.5 |
| Salt | 1.3 |

*The whey solids had been treated by lactose crystallization and electrodialysis to provide a whey product having 30 percent protein, 55 percent lactose and 8 percent ash. The balance comprises fat and edible acids.

The dressing obtained has a pH of 3.8 and has the characteristic texture, rheological properties and mouth feel of a commercially available mayonnaise having egg yolk solids as the emulsifying agent.

By the present invention, an emulsifying agent has been provided which may be used to replace egg yolk in the preparation of emulsified oil dressings having from about 50 percent to about 85 percent oil. The dressings prepared with the emulsifying agent of the present invention are stable and have the characteristic appearance of emulsified oil dressings prepared with egg yolk as the emulsifying ingredient.

What is claimed is:

1. An emulsified oil dressing having a pH in the range of from about 3 to about 4.5 comprising water, oil, flavoring materials and an emulsifying agent, said emulsifying agent consisting essentially of serum protein obtained from milk, said oil being present at a level of from about 50 to about 80 percent by weight, said serum protein being at least about 70 percent by weight denatured protein when said oil is present at a level of from about 50 to about 70 percent by weight and said serum protein being less than about 20 percent by weight denatured protein when said oil is present at a level of from about 70 to about 80 percent by weight, said serum protein being present at a level of from about 0.5 percent to about 5.0 percent by weight of said dressing.

2. An emulsified oil dressing in accordance with claim 1 wherein said serum protein is derived from whey.

3. An emulsified oil dressing in accordance with claim 2 wherein said whey is treated to provide a whey product having from about 25 to about 80 percent by weight protein, from about 15 to about 65 percent lactose and less than about 50 percent by weight ash, the level of said ash being based on the level of said protein.

4. An emulsified oil dressing in accordance with claim 1 wherein said oil is present at a level of from about 50 to about 70 percent by weight and wherein said serum protein is present at a level of from about 3 to about 5 percent by weight.

5. An emulsified oil dressing in accordance with claim 1 wherein said oil is present at a level of from about 70 to about 80 percent by weight and wherein said serum protein is present at a level of from about 0.5 to about 1.5 percent by weight.

6. A method for making an emulsified oil dressing having a pH in the range of from about 3 to about 4.5 comprising the steps of treating whey to provide a whey product having from about 25 to about 80 percent by weight serum protein, from about 15 to about 65 percent by weight lactose and less than about 50 percent by weight ash, the level of said ash being based on the level of said protein dispersing, said whey product in water to provide an aqueous whey dispersion, blending said aqueous whey dispersion with an oil and sufficient edible acid to provide a loose emulsion having a pH in the range of from about 3 to about 4.5 and homogenizing said loose emulsion to provide an emulsified oil dressing having the appearance of a mayonnaise-type dressing, said oil being present at a level of from about 50 to about 80 percent by weight, said serum protein being at least about 70 percent by weight denatured protein when said oil is present at a level of from about 50 to about 70 percent by weight and said serum protein being less than about 20 percent by weight denatured protein when said oil is present at a level of from about 70 to about 80 percent by weight, said serum protein being present at a level of from about 0.5 to about 5.0 percent by weight of said dressing.

7. A method in accordance with claim 6 wherein said oil is present at a level of from about 50 to about 70 percent by weight and wherein said whey product is present at a level sufficient to provide from about 3 to about 5 percent by weight serum protein.

8. A method in accordance with claim 6 wherein said oil is present at a level from about 70 to about 80 percent by weight and wherein said whey is present at a level sufficient to provide from about 0.5 to about 1.5 percent by weight serum protein.

* * * * *